United States Patent Office.

JULES THEODORE JULLIEN, MONTELIMAR, FRANCE.

MANUFACTURE OF FERTILIZERS.

SPECIFICATION forming part of Letters Patent No. 354,983, dated December 28, 1886.

Application filed November 11, 1886. Serial No. 218,612. (No specimens.) Patented in France June 2, 1886, No. 176,461.

*To all whom it may concern:*

Be it known that I, JULES THEODORE JULLIEN, a citizen of the French Republic, residing at Montelimar, in the French Republic, have invented certain new and useful Improvements in the Manufacture of Fertilizers, (for which I have obtained Letters Patent in France, No. 176,461, dated June 2, 1886,) of which the following is a full, clear and exact description.

This invention relates to the manufacture of fertilizers, and has for its object to produce a liquid fertilizer possessing anti-phylloxeric properties.

The invention consists in the mode of preparing the fertilizer and in the new article of manufacture, substantially as hereinafter described, and as set forth in the claims.

The manufacture of the anti-phylloxeric fertilizer is based, first, upon the fact that sewage water, or, in fact, all liquid animal excrements, or solutions of solid animal excretions, are solvents of sulphur, a property due, no doubt, to the presence of natural sulphides; second, upon the fact that all fecal matter or organic matter undergoing putrefaction or decomposition in the presence of sulphur in solution, in sewage water, or a solution of fecal matter form organic sulphides; third, upon the property of a solution of sulphur in liquid sewage, or solutions of sulphur in fecal or decomposed organic matter, to dissolve sulphide of carbon.

The sulphur and sulphide of carbon constitute the anti-phylloxeric elements of the fertilizer.

In the manufacture of the fertilizer I form a saturated solution of sewage water and sulphur in a closed vessel, the time depending on the amount of sulphur employed, while the amount of the latter depends, first, on the strength the solution is to have; secondly, on the sulphides already present in the sewage and on the volume of organic matter held in solution and suspension.

For general purposes I employ concentrated liquid sewage, to which I add enough sulphur to form a saturated solution. The natural sulphides present may be increased by employing more or less concentrated sewage, or by the addition thereto of liquid animal excretions or urine, or by the addition of soluble sulphides and of ligneous, proteic, pectic, albuminous, amylaceous, or fatty substances—as, for instance, guano or the excrements of ordinary fowl, or of sheep, swine, goats, &c.—or blood or the offal from slaughter-houses, olive and nut cakes, beet-root pulp, the refuse from sugar-refineries and from mills, saw-dust, barnyard manure, &c., which should preferably be composted by allowing them to undergo a partial fermentation and decomposition before their introduction into the liquid sewage.

The mixture is agitated from time to time to facilitate and hasten the solution of the soluble matter as well as the sulphur and the formation of the sulphides.

When the solution of sulphur is completed, which generally takes place in from thirty to sixty days, according to the temperature operated under and according to the quantities of sulphides present, all the liquid portion is decanted or drawn off and sulphide of carbon added thereto until a saturated solution is obtained.

The liquid fertilizer so obtained may be kept for an indefinite period of time in closed vessels without undergoing any alteration or losing any of its properties, and may be mixed with water in any proportion without danger of a separation of the sulphide of carbon from its combinations, and may in this manner be effectually used in the treatment of vines infected with phylloxera, combining in itself not only fertilizing properties but also anti-phylloxeric properties.

Having described my invention, what I claim is—

1. The process of preparing a combined fertilizer and anti-phylloxeric, which consists in dissolving sulphur in liquid sewage or equivalent fertilizing agent and adding sulphide of carbon to the solution.

2. As a new article of manufacture, a combined fertilizer and anti-phylloxeric consisting of liquid sewage or equivalent fertilizing agent, sulphur, and sulphide of carbon.

In testimony that I claim the foregoing I have hereunto set my hand this 25th day of October, 1886.

JULES THEODORE JULLIEN.

Witnesses:
ROBT. M. HOOPER,
JOSEPH PETKER.